(12) United States Patent
Shinozuka

(10) Patent No.: US 11,691,295 B2
(45) Date of Patent: Jul. 4, 2023

(54) ROBOT HAND

(71) Applicant: SHINANO KENSHI CO., LTD., Ueda (JP)

(72) Inventor: Yukio Shinozuka, Nagano (JP)

(73) Assignee: SHINANO KENSHI CO., LTD., Ueda (JP)

( * ) Notice: Subject to any disclaimer, the term of this patent is extended or adjusted under 35 U.S.C. 154(b) by 0 days.

(21) Appl. No.: 17/635,271

(22) PCT Filed: Nov. 26, 2020

(86) PCT No.: PCT/JP2020/044078
§ 371 (c)(1),
(2) Date: Feb. 14, 2022

(87) PCT Pub. No.: WO2021/107039
PCT Pub. Date: Jun. 3, 2021

(65) Prior Publication Data
US 2022/0288794 A1    Sep. 15, 2022

(30) Foreign Application Priority Data

Nov. 29, 2019 (JP) ................................. 2019-217305
Nov. 24, 2020 (JP) ................................. 2020-194376

(51) Int. Cl.
*B25J 15/04* (2006.01)

(52) U.S. Cl.
CPC ....... *B25J 15/0475* (2013.01); *B25J 15/0408* (2013.01); *B25J 15/0425* (2013.01)

(58) Field of Classification Search
CPC ................ B25J 15/0475; B25J 15/0408; B25J 15/0425; B25J 15/045; B25J 15/0491
USPC ........................................ 294/86.4, 106, 213
See application file for complete search history.

(56) References Cited

U.S. PATENT DOCUMENTS

| 3,202,449 | A | * | 8/1965 | Lemelson | B25J 15/0213 |
| | | | | | 901/29 |
| 4,114,464 | A | * | 9/1978 | Schubert | B25J 15/0213 |
| | | | | | 901/38 |
| 4,600,357 | A | | 7/1986 | Coules | |
| 4,623,183 | A | * | 11/1986 | Aomori | B25J 15/103 |
| | | | | | 294/86.4 |

(Continued)

FOREIGN PATENT DOCUMENTS

| CN | 201376279 Y | 1/2010 |
| CN | 102431037 A | 5/2012 |

(Continued)

OTHER PUBLICATIONS

Dec. 22, 2020 Office Action issued in Japanese Patent Application No. 2020-194376.

(Continued)

*Primary Examiner* — Paul T Chin
(74) *Attorney, Agent, or Firm* — Oliff PLC

(57) ABSTRACT

A robot hand includes a motor with a rotary shaft, an accommodating member accommodating a distal end of the rotary shaft, a plurality of swing members swinging with respect to the accommodating member due to rotation of the rotary shaft, and a plurality of claw members swinging with the plurality of swing members.

7 Claims, 6 Drawing Sheets

(56) References Cited

U.S. PATENT DOCUMENTS

| | | | |
|---|---|---|---|
| 6,217,094 B1* | 4/2001 | Hanaduka | B25J 15/0213 294/907 |
| 6,918,622 B2* | 7/2005 | Kim | B25J 15/10 901/34 |
| 8,414,043 B2* | 4/2013 | Albin | B25J 15/0213 294/106 |
| 9,718,195 B1* | 8/2017 | Youmans | B25J 15/103 |
| 9,782,902 B1 | 10/2017 | Kim et al. | |
| 10,081,111 B1* | 9/2018 | Xiong | B25J 15/10 |
| 10,377,045 B2* | 8/2019 | Xiong | B25J 15/103 |
| 10,654,175 B2* | 5/2020 | Watanabe | B25J 15/0028 |
| 2012/0177473 A1* | 7/2012 | Smith | G07F 17/0092 294/198 |
| 2015/0151433 A1* | 6/2015 | Rust | B25J 15/0213 294/106 |
| 2019/0091876 A1 | 3/2019 | Xiong et al. | |
| 2019/0143534 A1 | 5/2019 | Watanabe et al. | |
| 2022/0314464 A1* | 10/2022 | Shinozuka | B25J 15/0475 |

FOREIGN PATENT DOCUMENTS

| | | |
|---|---|---|
| CN | 207788984 U | 8/2018 |
| JP | S59-167687 U | 11/1984 |
| JP | 2000-288971 A | 10/2000 |
| JP | 3214039 U | 12/2017 |
| JP | 2019-089186 A | 6/2019 |

OTHER PUBLICATIONS

Dec. 28, 2020 International Search Report issued in International Patent Application No. PCT/JP2020/044078.

May 17, 2022 International Preliminary Report on Patentability issued in International Patent Application No. PCT/JP2020/044078.

* cited by examiner

ROBOT HAND

TECHNICAL FIELD

The present invention relates to a robot hand.

BACKGROUND ART

Patent Document 1 describes a robot hand. In such a robot hand, claw members are driven by meshing of the gears driven by a motor.

PRIOR ART DOCUMENT

Patent Document

[Patent Document 1] Japanese Examined Utility Model Application Publication No. 3214039

SUMMARY OF THE INVENTION

Problems to be Solved by the Invention

In Patent Document 1 mentioned above, a claw member is fixed to a front side of the gear in an axial direction of the robot hand. Therefore, there is a limit to an object to be gripped by the claw members. In addition, since the periphery of the gear is covered with a cover, the size of the robot hand is increased. Furthermore, since an area around a part where the claw member and the gear are fixed is also covered with the cover, such a cover is firstly needed to be detached in replacing the claw member, which complicates replacement work.

The present invention has an object to provide a robot hand in which a range of an object to be gripped is expanded, a size is reduced, and a claw member is easily replaced.

Means for Solving the Problems

The above object is achieved by a robot hand including: a motor with a rotary shaft; an accommodating member accommodating a distal end of the rotary shaft; a plurality of swing members swinging with respect to the accommodating member due to rotation of the rotary shaft; and a plurality of claw members swinging with the plurality of swing members, wherein a worm gear portion is provided on an outer circumference of the rotary shaft, the swing member includes a worm wheel portion provided on a part of an outer circumference of the swing member and meshing with the worm gear portion, and a fixed surface provided on a part of the outer circumference of the swing member and on an opposite side of the rotary shaft with respect to a swing center of the swing member, the claw member is detachably fixed to the fixed surface by a first fixing member, and the accommodating member exposes the first fixing member such that the first fixing member is detachable.

Effects of the Invention

It is possible to provide a robot hand in which a range of an object to be gripped is expanded, a size is reduced, and a claw member is easily replaced.

MODES FOR CARRYING OUT THE INVENTION

Figure 1:
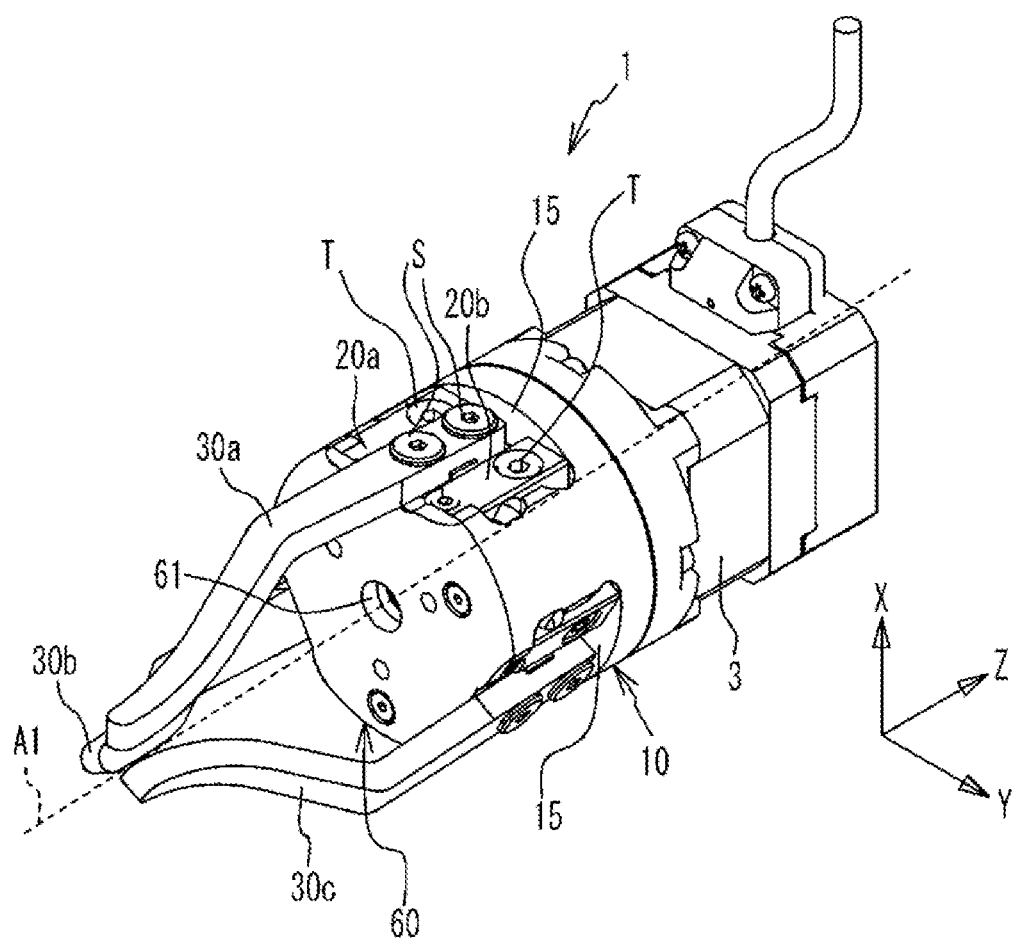
FIG. 1 is a perspective view of a robot hand.

FIG. 1 is a perspective view of a robot hand 1. FIG. 1 illustrates X, Y, and Z directions orthogonal to one another. The robot hand 1 includes a motor 3, a bracket 10, support members 20a and 20b, claw members 30a to 30c, and a cover 60. The motor 3 is a drive means, such as a stepping motor, for opening and closing the claw members 30a to 30c.

The bracket 10 is attached to a distal end side of the motor 3. The claw members 30a to 30c are swingably held by the bracket 10, which will be described in detail later. Although the bracket 10 is formed into a substantially cylindrical shape, three recess portions 15 are formed on an outer peripheral side surface at substantially equal angular intervals. The support members 20a and 20b are held in one recess portion 15, and the claw member 30a is swingably supported about its proximal end portion between the support members 20a and 20b. The same applies to the other claw members 30b and 30c. Therefore, the claw members 30a to 30c are arranged at equal angular intervals about a central axis A1 parallel to the Z direction. The claw members 30a to 30c have the same shape, but have different reference numerals for convenience of explanation. The disk-shaped cover 60 is fixed to the distal end side of the bracket 10. The cover 60 is formed with an opening 61 so that the central axis A1 passes through the cover 60.

Figure 2:
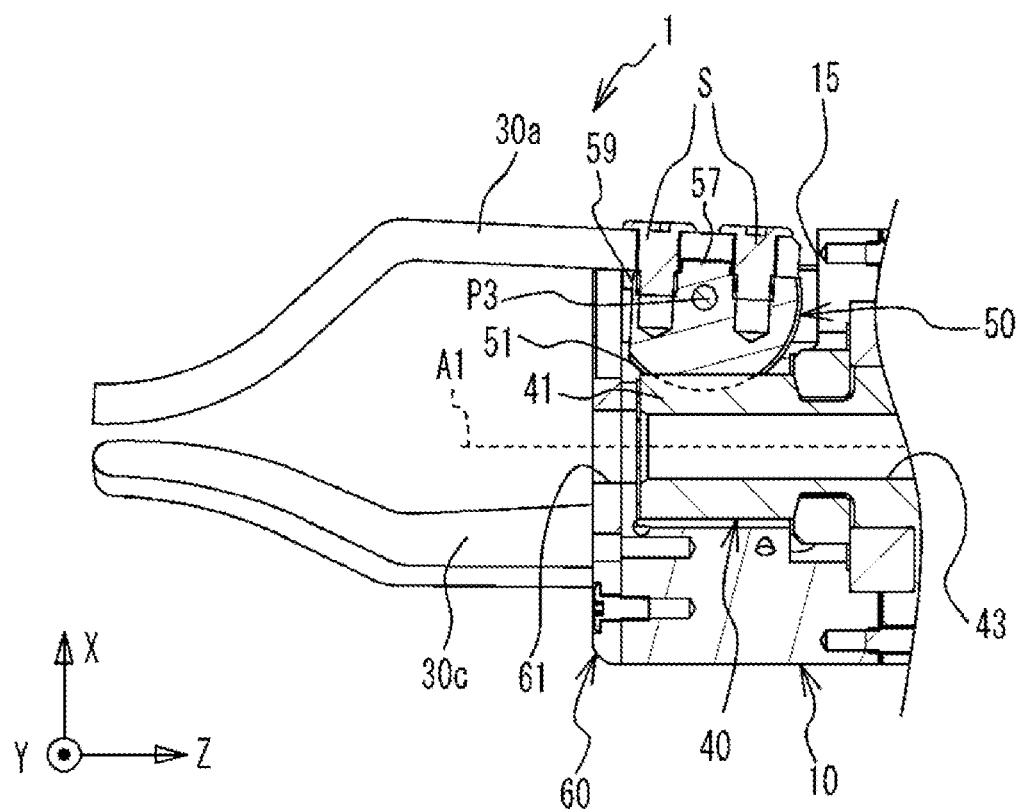
FIG. 2 is a partially cross sectional view of the robot hand.

FIG. 2 is a partially cross sectional view of the robot hand 1. In FIG. 2, the motor 3 is not illustrated. As illustrated in FIG. 2, a proximal end portion of the claw member 30a is fixed to a swing member 50 by screws S. The swing member 50 will be described in detail later. A rotary shaft 40 is a rotary shaft of the motor 3. The distal end of the rotary shaft 40 is accommodated in the bracket 10. The bracket 10 is an example of an accommodating member. When the rotary shaft 40 rotates, the swing member 50 swings within a predetermined range, and when the swing member 50 swings, the claw member 30a also swings within a predetermined range. The same applies to the claw members 30b and 30c. That is, the claw members 30a to 30c are opened and closed in accordance with the rotation of the rotary shaft 40, whereby an object is gripped. In FIG. 2, the rotary shaft 40 and the swing member 50 are illustrated in a simplified manner.

Figure 3:
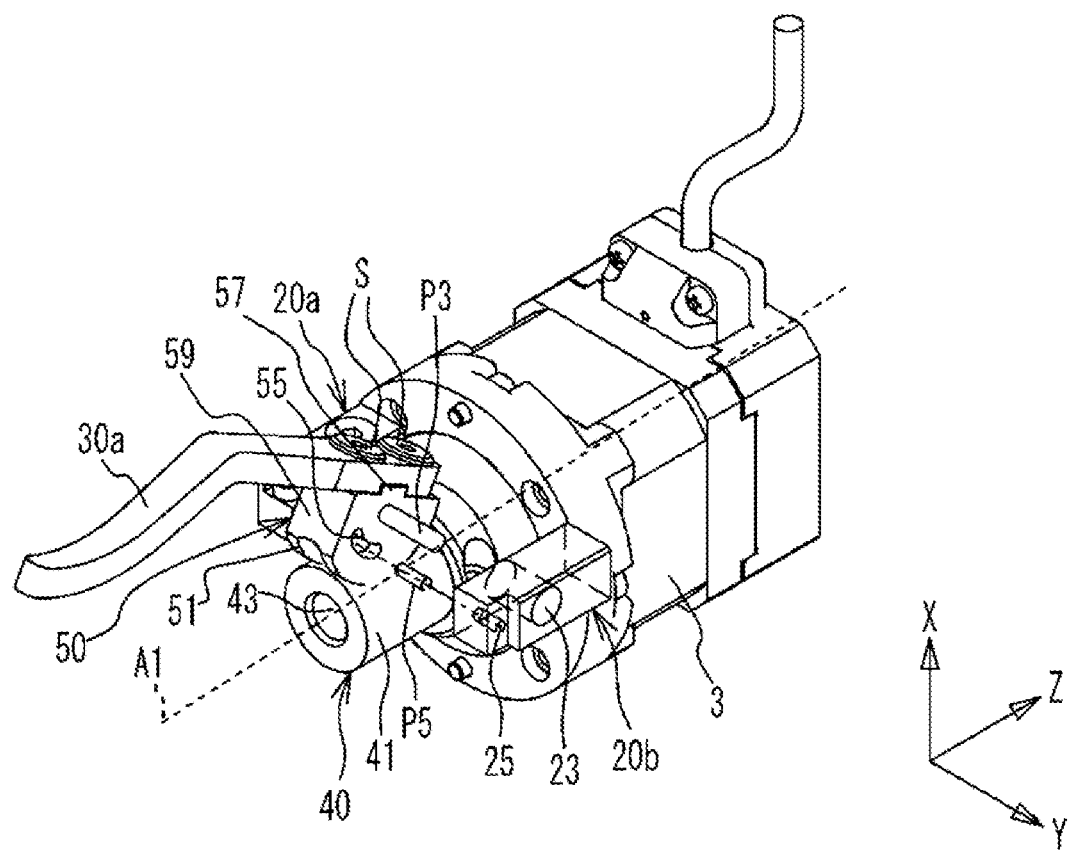
FIG. 3 is a view illustrating an internal configuration of a bracket.
Figure 4A:
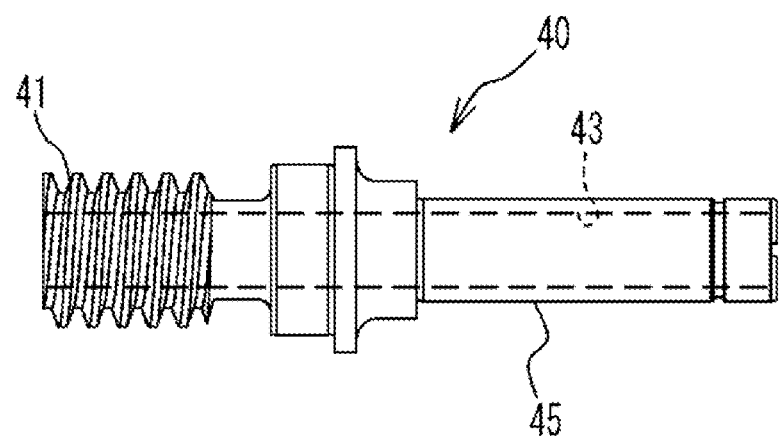
FIGS. 4A and 4B are external views of a rotary shaft.
Figure 4B:
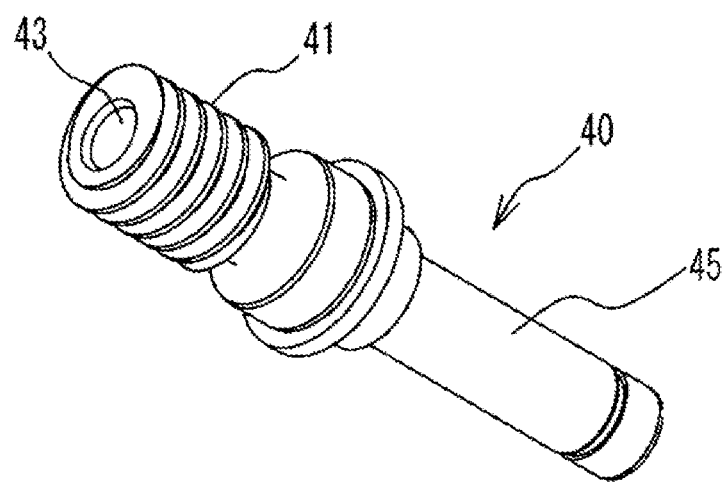
Figure 5A:
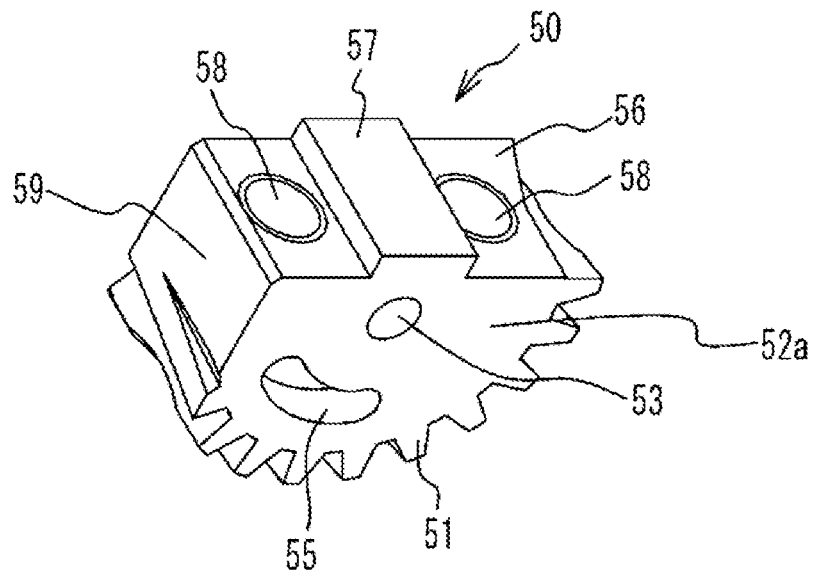
FIGS. 5A to 5C are external views of a swing member.
Figure 5B:
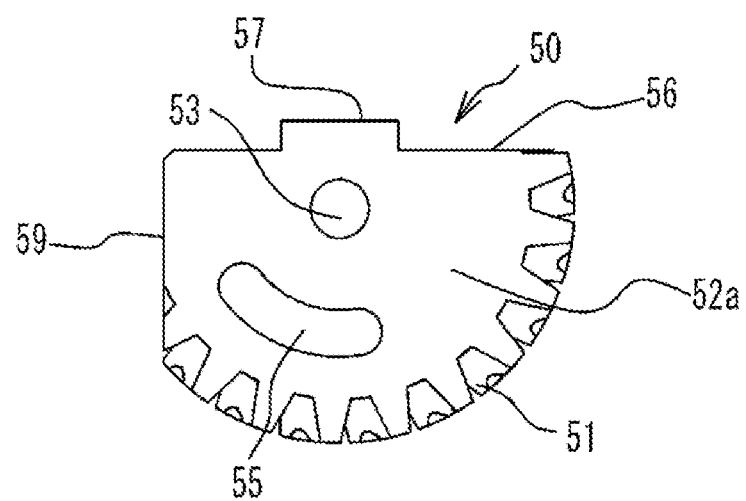
Figure 5C:
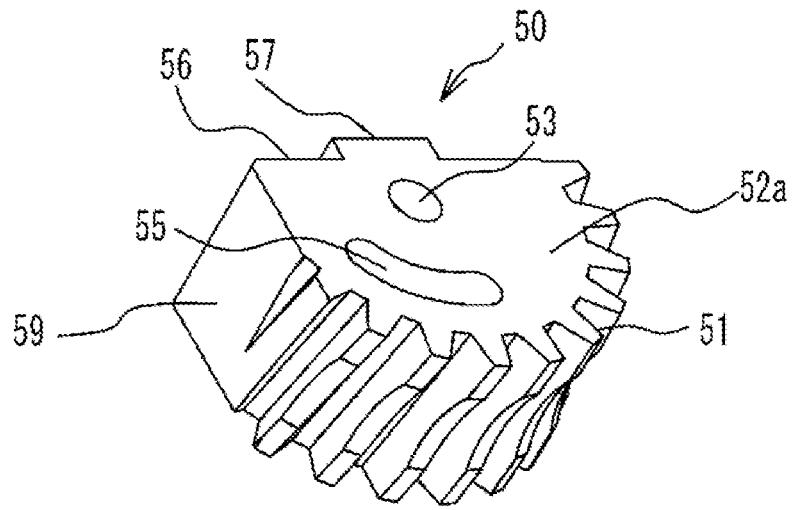

FIG. 3 is a view illustrating the internal configuration of the bracket 10. In FIG. 3, the bracket 10, the cover 60, and the claw members 30b and 30c are not illustrated. In FIG. 3, the rotary shaft 40 is illustrated in a simplified manner. Further, in FIG. 3, the support member 20b is illustrated away from the swing member 50 for easy understanding. FIGS. 4A and 4B are external views of the rotary shaft 40. FIGS. 5A to 5C are external views of the swing member 50. First, the rotary shaft 40 will be described. The rotary shaft 40 has a worm gear portion 41 formed on an outer circumferential portion on the distal end side protruding from a main body of the motor 3, and is formed into a hollow shaft shape having a through hole 43. The worm gear portion 41 may be formed by cutting the rotary shaft 40 or the like, or may have a cylindrical member having the worm gear portion 41 (not illustrated) fitted to the rotary shaft 40. Finally, the structure only has to integrally provide the worm gear portion 41 on the outer circumferential portion of the rotary shaft 40. The through hole 43 penetrates through the rotation center of the rotary shaft 40 in the axial direction. The diameter of the through hole 43 is constant in the longitudinal direction of the rotary shaft 40, but is not limited to this. A cylindrical outer circumferential surface 45 having a constant outer diameter is formed from the center to the proximal end side of the rotary shaft 40 in the axial direction, and a permanent magnet (not illustrated) constituting the motor 3 and the like are fixed to the cylindrical outer circumferential surface 45. The rotary shaft 40 is made of a metal such as stainless steel, but is not limited thereto.

Since the rotary shaft 40 is formed into the hollow shaft shape in this way and since the through hole 43 of the rotary shaft 40 and the opening 61 of the cover 60 communicate with each other as illustrated in FIG. 2, it is possible to achieve multi-functionality by mounting a camera that photographs an object to be gripped, an air suction/ejection device that injects and sucks air toward an object to be gripped through the through hole 43 and the opening 61, or the like inside. Further, since the rotary shaft 40 is formed into a hollow shaft shape and its weight is reduced, the weight of the entire robot hand 1 is also reduced. Furthermore, it is possible to appropriately dissipate heat generated from the motor 3 and frictional heat due to meshing of the worm gear portion 41 and the worm wheel portion 51 which will be described later.

The swing member 50 is formed into a substantially fan shape with a predetermined thickness. A central hole 53 penetrating in the thickness direction is formed. As illustrated in FIG. 3, a support pin P3 is press-fitted into the central hole 53 so as to penetrate through the swing member 50 in the thickness direction. One end of the support pin P3 is rotatably supported by a bearing (not illustrated) inserted into a holding hole 23 of the support member 20b illustrated in FIG. 3. Likewise, the support member 20a also supports the other end of the support pin P3 for rotation. The swing member 50 is made of, for example, an iron-based metal, but the swing member 50 is not limited thereto.

A worm wheel portion 51 having a plurality of teeth is formed in a portion formed into an arc shape about the central hole 53. The worm wheel portion 51 is formed within a predetermined angular range about the central hole 53. An angle at which the worm wheel portion 51 is formed, as compared to an angle at which the claw members 30a to 30c are opened, is needed to be sufficiently large so as to ensure the meshing of the gears. In FIG. 2, the meshing range between the worm gear portion 41 and the worm wheel portion 51 is about 40 degrees. By forming the worm wheel portion 51 over approximately 100 degrees, in the robot hand 1 illustrated in FIGS. 1 to 3, it is possible to open the claw members 30a to 30c up to about 60 degrees about the central axis A1 as the center line of the rotation axis, when an angle in the closed state is 0 degrees. Further, if the worm wheel portion 51 is formed close to 130 degrees (not illustrated), it is possible to open the claw members 30a to 30c to about 90 degrees about the central axis A1. In addition, if the worm wheel portion 51 is formed up to about 270 degrees (not illustrated) by reducing an area of a surface 56 described later without providing a surface 59 described later, it is possible to open the claw members 30a to 30c at 180 degrees or more at the maximum, and it is possible to accommodate the claw members 30a to 30c into grooves (not illustrated) provided on the outer edge of the robot hand 1. These illustrated values are only for the present embodiment, and the meshing amount (40 degrees in the above example) is influenced by gear design parameters based on the required specifications. Therefore, depending on the design, openable ranges of the claw members 30a to 30c may be larger or smaller than the example described above. Further, the surfaces 56 and 59 are continuously formed on the worm wheel portion 51 illustrated in FIG. 5 in the outer peripheral direction about the central hole 53 as the center. The surfaces 56 and 59 are substantially orthogonal to each other. Unlike the worm wheel portion 51, no teeth are formed on the surfaces 56 and 59. As described above, the swing member 50 is not provided with teeth over the entire outer circumference, and the worm wheel portion 51 is formed on a part of the outer circumference, so that the size is reduced.

As illustrated in FIGS. 2 and 3, the worm wheel portion 51 meshes with the worm gear portion 41 of the rotary shaft 40. Thus, when the rotary shaft 40 rotates, the swing member 50 swings about the support pin P3 as a fulcrum, which opens and closes the claw member 30a. Likewise, the worm wheel portion of the swing member for swinging the claw members 30b and 30c also meshes with the worm gear portion 41 of the rotary shaft 40. Therefore, the rotation of the rotary shaft 40 causes the three claw members 30a to 30c to open and close, which grips an object to be gripped. Further, since the motor 3 is a stepping motor, it is possible to stop the rotary shaft 40 at a predetermined rotational angular position. It is therefore possible to stop each of the claw members 30a to 30c at a predetermined position within the swing range.

Herein, effects of using the worm gear will be described. Since the worm gear portion 41 and the worm wheel portion 51 mesh with each other as a worm gear, it is possible to achieve a small size and a large reduction ratio as compared with a case of using, for example, a power transmission mechanism in which spur gears mesh with each other. This makes it possible to ensure a small size and a strong gripping force of the claw members 30a to 30c. Further, by achieving a large reduction ratio, it is possible to improve positional accuracy of the opening and closing operation of the claw members 30a to 30c. Furthermore, since the worm gear portion 41 is integrally formed in the rotary shaft 40 of the motor 3, it is advantageous for miniaturization as compared with a case where the rotary shaft and the worm gear are formed separately. In addition, the self-locking action works by reducing a lead angle of the worm gear so as to set a large reduction ratio of the worm gear portion 41 and the worm wheel portion 51. Therefore, even when external force is applied to any of the claw members 30a to 30c, the external force transmitted from the worm wheel portion 51 to the worm gear portion 41 cause the rotary shaft 40 not to rotate, thereby suppressing the positional displacement of the claw members 30a to 30c. This makes it possible to maintain the claw members 30a to 30c at a predetermined position even when the motor 3 is in a non-energized state, and this makes it possible to maintain the gripped state even when the power supply to the motor 3 is cut off after gripping a work (an object to be gripped). That is, saving energy is improved since non-powered gripping is achieved, and safety is also improved since the gripping of the work is not released due to an unexpected power failure or the like.

A protruding portion 57 is formed on the surface 56, and is engaged with a concave portion formed at the proximal end portion of the claw member 30a as illustrated in FIG. 3. Further, two screw holes 58 are formed on the surface 56 so as to sandwich the protruding portion 57, and the above-mentioned screws S are screwed. Herein, the bracket 10 is formed so as to expose heads of the screws S described above. With such a structure, it is possible to easily detach the screws S and to easily replace the claw member 30a, thereby reducing working processes in a case of replacement due to wear or breakage, or due to a type of a work (object to be gripped). In this way, the replaceability of the claw member 30a is improved. The high replacement workability of the claw member 30a means high assembly workability of the robot hand 1, which reduces the assembly processes, thereby contributing to the reduction of production cost. The same applies to the other claw members 30b and 30c. Additionally, since the bracket 10 is formed so as to expose the heads of the screws S described above, the robot hand 1 is reduced in size, and more specifically, in the radial direction about the central axis A1. The screw S is an example of a first fixing member.

Further, the claw member 30a is fixed to the surface 56 of the swing member 50 provided on the side opposite to the rotary shaft 40 with respect to the swing center of the swing member 50. In other words, the proximal end portion of the claw member 30a is fixed to the outside in the radial direction about the central axis A1 with respect to the swing center of the swing member 50. That is, a wide distance between the proximal end portion of the claw member 30a and the central axis A1 is ensured, and the same applies to the other claw members 30b and 30c. It is thus possible to grip a large member, and the range of an object to be gripped is expanded. In this way, it is possible to grip a large member by the robot hand 1 and the size is reduced.

An arc-shaped regulation groove 55 about the central hole 53 is formed on a fan-shaped side surface 52a of the swing member 50. Further, as illustrated in FIG. 3, the support member 20b is formed into a substantially rectangular shape, a fitting hole 25 is formed on a surface facing the side surface 52a of the swing member 50, and a proximal end of the regulation pin P5 is press-fitted into the fitting hole 25. Further, a distal end of the regulation pin P5 is movably inserted into the regulation groove 55 of the swing member 50. That is, an outer diameter of the regulation pin P5 is formed to be smaller than the width of the regulation groove 55. When the swing member 50 swings about the support pin P3 as a fulcrum, the regulation pin P5 moves relative to the inside of the regulation groove 55. Herein, when the swing member 50 swings in such a direction as to open the claw member 30a, the regulation pin P5 comes into contact with an end of the regulation groove 55. Thus, further swinging of the swing member 50 in that direction is regulated. Likewise, when the swing member 50 swings in such an opposite direction as to close the claw member 30a, the regulation pin P5 comes into contact with the other end of the regulation groove 55. Thus, further swinging of the swing member 50 in that direction is regulated. In this way, the swing range of the claw member 30a is regulated. With this structure in which the swing range is regulated by the regulation pin P5 and the regulation groove 55, it is possible to prevent a failure in which the worm gear portion 41 and the worm wheel portion 51 are disengaged from each other even when a maintenance worker of the robot hand 1 accidentally moves the swing member 50 in replacing the claw member 30a. A similarly regulation groove is formed on the side surface of the swing member 50 illustrated in FIGS. 5A to 5C opposite to the side surface 52a on which the regulation groove 55 is formed, and the swing range of the swing member 50 is regulated by a regulation pin held by the support member 20a and this regulation groove. The swing range of the claw members 30b and 30c is regulated by the same configuration. The regulation pin P5 and the regulation groove 55 are an example of a regulation portion. The regulation pin P5 is an example of a regulation protrusion. The regulation pin P5 and the regulation groove 55 to which the distal end thereof moves are not needed to be provided on both side surfaces (side surface 52a and the side surface opposite to the side surface 52a) of the swing member 50, and may be provided on one of the side surfaces.

Further, as illustrated in FIGS. 2 and 3, each of the support members 20a and 20b is fixed to the bracket 10 by a screw T. The bracket 10 is formed so as to expose a head of the screw T. Therefore, by detaching the screw T and by detaching the support members 20a and 20b from the bracket 10, it is possible to easily detach the swing member 50 from the bracket 10. Thus, the replacement workability of the swing member 50 is improved. For example, when the worm wheel portion 51 is worn, the swing member 50 may be needed to be replaced, the above configuration is effective in such a case. The same applies to the support members corresponding to the other claw members 30b and 30c. The screw T is an example of a second fixing member.

The worm gear portion 41 and the worm wheel portion 51 rotate in a manner of sliding contact, unlike the meshing of general spur gears. Therefore, in general, the metal material of the gear on the output side is softer than the metal material of the gear on the input side in consideration of ease of sliding and the like. Therefore, the gear on the output side is more likely to wear than the gear on the input side. Since the worm wheel portion 51 on the output side is easily replaced as described above in the present embodiment, even if the worm wheel portion 51 is made of a material softer than the worm gear portion 41 so that the worm wheel portion 51 is worn, it is possible to easily replace the worm wheel portion 51. The high replacement workability of the swing member 50 means high assembly workability in production, and the assembly processes is reduced, which contributes to the reduction of production cost.

As described above, since the support members 20a and 20b are fixed to the bracket 10 by the screws T whose head is exposed, the replacement workability and the assembly workability of the swing member 50 are high. This facilitates adjustment when the swing member 50 is assembled to the robot hand 1. There are variations in the finish of gear members such as the worm gear portion 41 and the worm wheel portion 51 and the dimensions of the bracket 10 and the like, which also cause variations in the distance between the centers of each gear. If the robot hand 1 is designed in consideration of these variations, the backlash of the swing member 50 becomes large. On the other hand, in order to improve the positional accuracy of the claw members 30a to 30c of the robot hand 1, the backlash of the swing member is required to be as small as possible. In order to solve such an antinomy, a shim is sandwiched between the support members 20a and 20b and the bracket 10, and the distance between the support members 20a and 20b from the central axis A1 in the radial direction is adjusted, thereby reducing the backlash of the swing member 50 (the worm gear portion 41 and the worm wheel portion 51) and improving the assembly accuracy of the robot hand 1.

Figure 6:
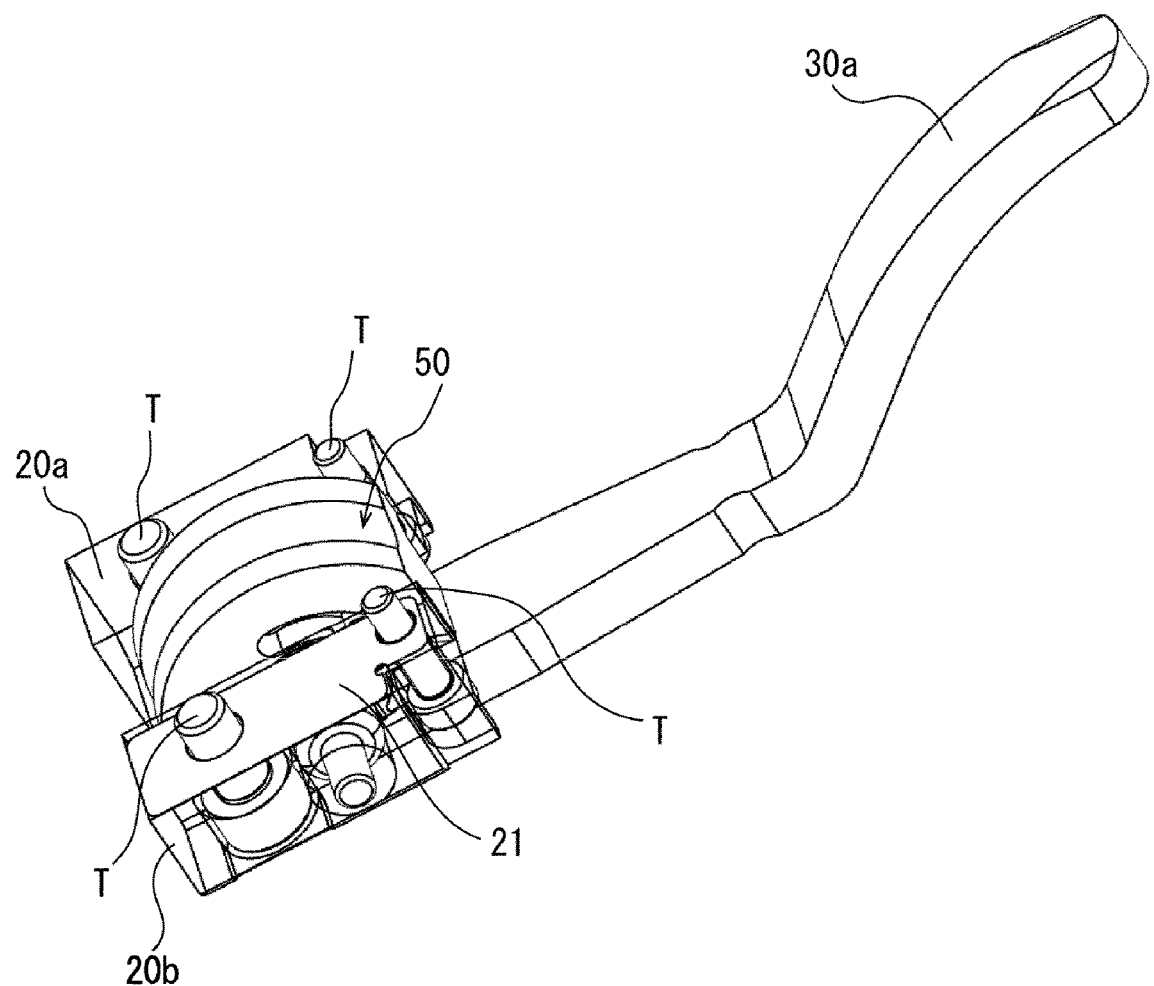
FIG. 6 is a partially perspective view illustrating an adjustment shim.

FIG. 6 is a partial perspective view for illustrating an example of the shim, and mainly illustrates the support members 20a and 20b, the swing member 50, the claw member 30a, the screw T, and shim 21, and the other parts are omitted. Further, the support members 20a and 20b are illustrated transparently. In the drawings prior to FIG. 6, for simplification of the explanation, one screw T is provided for each of the support members 20a and 20b, but in FIG. 6, two screws T are provided. The support members 20a and 20b are fixed to the bracket 10 (not illustrated in FIG. 6) by the screws T, but in FIG. 6, the side in contact with the bracket 10 is upper side. The shim 21 is a thin metal plate, and has two holes through which the screws T pass. In FIG. 6, as an example for clarifying the existence of the shim 21, only one shim 21 is provided on the side of the support member 20b, and the shim 21 is not provided on the side of the support member 20a. Actually, a plurality of shims may be provided in layers for adjustment, the number of shims may be different between the support member 20a side and the support member 20b side, or the number of shims may be the same on the support member 20a side and the support member 20b side. It is possible to achieve such adjustment with ease in the assembly of production and in the replacement of the swing member 50, in the basis of the feature of the present invention in that the support members 20a and 20b are fixed to the bracket 10 by the screws T whose heads are exposed.

As described above, the swing member 50 has a substantially fan shape with a predetermined thickness, the central hole 53 penetrating in the thickness direction is formed, and the worm wheel portion 51 is formed at a portion formed into an arc shape about the central hole 53. The surface 56 is formed on the worm wheel portion 51 in the outer circumferential direction about the central hole 53, and the protruding portion 57 is formed on the surface 56 and is engaged with the recess portion formed at the proximal end portion of the claw member 30a. The proximal end portion of the claw member 30a is located on the outer peripheral side in the radial direction of the portion where the worm gear portion 41 and the worm wheel portion 51 are engaged with each other when viewed from the central axis A1, that is, near the outer edge of the side surface of the substantially cylindrical bracket 10. Since the disk-shaped cover 60 is provided on the distal end side of the bracket 10, the portion where the worm gear portion 41 and the worm wheel portion 51 are engaged with each other is not exposed to an object to be gripped. This prevents lubricant applied to the worm gear and metal powders generated by the wear of the meshing from directly scattering to an object to be gripped.

In general, the robot hand often performs an operation of gripping an object to be gripped placed on a table from directly above. Therefore, it is needed to pay attention to unnecessary contamination from the robot hand to an object to gripped, and it is preferable to prevent contaminant within the robot hand from reaching an object to gripped through a gap on the distal end side of the robot hand. As in the present embodiment, the proximal end portions of the claw members 30a to 30c are located near the outer edge of the side surface of the bracket 10 of the robot hand 1, which covers the distal end side of the robot hand 1 with a simple cover, thereby preventing contaminant within the robot hand 1 from reaching an object to be gripped. The cover 60 is formed with the opening 61 for achieving multifunction by use of the through hole 43 in a case of forming the rotary shaft 40 into a hollow shaft shape, and the structure does not leak contaminant within the robot hand 1. Further, since this structure does not leak contaminant within the robot hand 1, it also has a function of reducing the invasion of dust from the outside of the robot hand 1. A foreign matter is prevented from entering the meshing portion between the worm gear portion 41 and the worm wheel portion 51, which improves the durability of the robot hand 1.

In the case of the robot hand 1 using the three claw members 30a to 30c as in the present embodiment, the number of threads of the worm gear portion 41 may be a multiple of three. When the number of threads of the worm gear portion 41 is one, the worm wheel portion 51 combined with the claw members 30a to 30c requires that the teeth are relatively different in phase by 120 degrees. That is, three types of the worm wheel portions 51 are required. On the other hand, when the number of threads of the worm gear portion 41 is a multiple of three, the worm wheel portions 51 combined with the above-mentioned claw members 30a to 30c all have the same shape. As a result, the shape of the worm wheel portion 51 is unified to reduce the cost, which generates secondary effects such as elimination of work mistakes in assembly. Further, for the same reason, in a case of a robot hand using two claw members, the number of threads of the worm gear portion 41 may be a multiple of 2. Furthermore, in order to make the rotary shaft 40 common between the robot hand using the three claw members and the robot hand using the two claw members, the number of threads of the worm gear portion 41 may be a multiple of 6. That is, when m (m is an integer of 2 or more) pairs of claw members and swing members are provided, the number of threads of the worm gear portion may be a multiple of m.

In the above embodiment, the regulation groove 55 is formed on the swing member 50 that swings, and the regulating pin P5 is fixed to the support member 20b that does not swing, but the present invention is not limited to this. For example, the regulation pin P5 may be fixed at a position radially away from the central hole 53 on the side surface 52a of the swing member 50, and a regulation groove may be provided, on the surface of the support member 20b facing the side surface 52a, to regulate the movement range of the regulation pin P5 movable inside the regulation groove. In this way, it is possible to reverse the relationship between the regulation pin P5 and the regulation groove as long as the replacement of the swing member 50 and the assembly of the robot hand 1 are not hindered.

In the above embodiment, the claw member 30a and the swing member 50 are separate, but may be integrally formed. In this case, the above-mentioned □m (m is an integer of 2 or more) pair of the claw members and the swing member□ means □a swing member integrated with m (m is an integer of 2 or more) claw members□. The same applies to the claw members 30b and 30c. The support members 20a and 20b are separate from the bracket 10, but are not limited to this, and one of the support members 20a and 20b is integrated with the bracket 10 as long as the replacement of the swing member 50 and the assembly of the robot hand 1 are not hindered. In this case, the above-mentioned shim 21 is used for adjustment in the support member that is not integrally formed with the bracket 10.

Additionally, as compared to a robot hand of the type that drives a claw member using a cam or a cam follower, the robot hand 1 in the above embodiment does not need to be specially designed like a cam or a cam follower, and the worm gear portion 41 and the worm wheel section 51, which are technologies having accumulated knowledge and widely used in the world than before, is used, thereby achieving cost reduction. In addition, the load bearing capacity and durability are improved as compared with a case of using a cam or a cam follower.

While the exemplary embodiments of the present invention have been illustrated in detail, the present invention is not limited to the above-mentioned embodiments, and other embodiments, variations and modifications may be made without departing from the scope of the present invention.

The invention claimed is:

1. A robot hand comprising:
   a motor with a rotary shaft;
   an accommodating member accommodating a distal end of the rotary shaft;
   a plurality of swing members swinging with respect to the accommodating member due to rotation of the rotary shaft;
   a plurality of claw members swinging with the plurality of swing members; and
   a support member supporting the swing member,
   wherein
   a worm gear portion is provided on an outer circumference of the rotary shaft,
   the swing member includes
      a worm wheel portion provided on a part of an outer circumference of the swing member and meshing with the worm gear portion, and
      a fixed surface provided on a part of the outer circumference of the swing member and on an opposite side of the rotary shaft with respect to a swing center of the swing member,
   the claw member is detachably fixed to the fixed surface by a first fixing member,
   the accommodating member exposes the first fixing member such that the first fixing member is detachable,
   the support member is detachably fixed to the accommodating member by a second fixing member, and
   the accommodating member exposes the second fixing member such that the second fixing member is detachable.

2. The robot hand according to claim 1, comprising a regulation portion regulating a swing range of the swing member.

3. The robot hand according to claim 2, wherein the regulation portion includes
   a regulation groove formed in one of the swing member and the accommodating member, and
   a regulation protrusion formed in the other of the swing member and the accommodating member, and relatively movable in the regulation groove in accordance with swinging of the swing member.

4. The robot hand according to claim 1, wherein the worm wheel portion is formed within an angle range of 270 degrees or less about the swing center of the swing member.

5. The robot hand according to claim 1, wherein the worm wheel portion is formed within an angle range of 180 degrees or less about the swing center of the swing member.

6. The robot hand according to claim 1, wherein
   m (m is an integer of 2 or more) pairs of the claw members and the swing members are provided, and
   the number of threads on the worm gear portion is a multiple of the m.

7. The robot hand according to claim 1, wherein the rotary shaft is formed into a hollow shaft shape.

* * * * *